(12) United States Patent
Takayama et al.

(10) Patent No.: US 12,124,104 B2
(45) Date of Patent: Oct. 22, 2024

(54) CURING DEVICE HAVING LIGHT SOURCE TO EMIT LIGHT TO CURE LIQUID ON PRINTING MEDIUM, AND PRINTING DEVICE INCLUDING THE CURING DEVICE

(71) Applicant: BROTHER KOGYO KABUSHIKI KAISHA, Nagoya (JP)

(72) Inventors: Haruhisa Takayama, Nagoya (JP); Atsushi Ito, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 190 days.

(21) Appl. No.: 17/825,743

(22) Filed: May 26, 2022

(65) Prior Publication Data

US 2022/0382011 A1    Dec. 1, 2022

(30) Foreign Application Priority Data

May 31, 2021 (JP) ................................. 2021-090981

(51) Int. Cl.
*G02B 7/08* (2021.01)
*B41J 11/00* (2006.01)

(52) U.S. Cl.
CPC ........... *G02B 7/08* (2013.01); *B41J 11/00214* (2021.01)

(58) Field of Classification Search
CPC .. G02B 7/08; B41J 11/00214; B41J 11/00212
See application file for complete search history.

(56) References Cited

U.S. PATENT DOCUMENTS

| | | | |
|---|---|---|---|
| 2007/0070162 A1* | 3/2007 | Yokoyama | B41J 11/00218 347/102 |
| 2009/0073200 A1 | 3/2009 | Tezuka et al. | |
| 2011/0157272 A1 | 6/2011 | Ikehata et al. | |
| 2013/0235135 A1 | 9/2013 | Kondo et al. | |
| 2015/0097887 A1* | 4/2015 | Honobe | B41J 11/00212 347/16 |
| 2015/0124017 A1 | 5/2015 | Aoyama | |
| 2018/0281311 A1* | 10/2018 | Herrmann | B33Y 10/00 |

FOREIGN PATENT DOCUMENTS

| | | |
|---|---|---|
| JP | H05-318715 A | 12/1993 |
| JP | H10-278241 A | 10/1998 |
| JP | 2001-328254 A | 11/2001 |
| JP | 2004-209705 A | 7/2004 |
| JP | 2006-68937 A | 3/2006 |
| JP | 2006-327124 A | 12/2006 |

(Continued)

*Primary Examiner* — Bradley W Thies
(74) *Attorney, Agent, or Firm* — KENEALY VAIDYA LLP

(57) ABSTRACT

A curing device includes a light emitting member, and a control device. The light emitting member has a light source configured to emit light to cure liquid on a printing medium. The light source and the printing medium are configured to be located with a gap therebetween. The gap is variable among a plurality of distances including a first distance and a second distance greater than the first distance. The control device is configured to perform: controlling the light source to emit light of an intensity based on the gap so that the intensity when the gap is the second distance is greater than when the gap is the first distance.

9 Claims, 10 Drawing Sheets

(56) References Cited

FOREIGN PATENT DOCUMENTS

| | | |
|---|---|---|
| JP | 2007-1248 A | 1/2007 |
| JP | 2008-221494 A | 9/2008 |
| JP | 2011-83917 A | 4/2011 |
| JP | 2013-184399 A | 9/2013 |
| JP | 2015-85648 A | 5/2015 |
| WO | 2010/021377 A1 | 2/2010 |

* cited by examiner

CURING DEVICE HAVING LIGHT SOURCE TO EMIT LIGHT TO CURE LIQUID ON PRINTING MEDIUM, AND PRINTING DEVICE INCLUDING THE CURING DEVICE

CROSS REFERENCE TO RELATED APPLICATION

This application claims priority from Japanese Patent Application No. 2021-090981 filed May 31, 2021. The entire content of the priority application is incorporated herein by reference.

BACKGROUND

A conventional inkjet printer is provided with a recording head that ejects a liquid onto a recording medium, and an ultraviolet irradiation device that irradiates light on the liquid deposited on the recording medium. The UV irradiation device can move vertically.

SUMMARY

The conventional inkjet printer described above prints an image on a recording medium by first ejecting liquid from the recording head so that the liquid impacts the recording medium and then fixing the liquid to the recording medium by irradiating the recording medium with light emitted from the UV irradiation device. Here, when the recording medium being printed has a three-dimensional shape, for example, the clearance between the UV irradiation device and the recording medium varies according to the uneven surface of the recording medium, and the intensity of light incident on the recording medium decreases as the clearance grows larger.

However, it is conceivable that the intensity of light can be modified by moving the UV irradiation device vertically according to the clearance between the device and the recording medium. This action can create uniform curing conditions for the liquid, suppressing a drop in image quality. However, this technique requires a mechanism for moving the UV irradiation device vertically, which leads to an increase in cost.

In view of the foregoing, it is an object of the present disclosure to provide a curing device and a printing device that can minimize an increase in cost while suppressing a decline in image quality caused by the shape of the printing medium.

In order to attain the above and other objects, one aspect of the disclosure provides a curing device. The curing device includes a light emitting member, and a control device. The light emitting member has a light source configured to emit light to cure liquid on a printing medium. The light source and the printing medium are configured to be located with a gap therebetween. The gap is variable among a plurality of distances including a first distance and a second distance greater than the first distance. The control device is configured to perform: controlling the light source to emit light of an intensity based on the gap so that the intensity when the gap is the second distance is greater than when the gap is the first distance.

According to another aspect, the disclosure provides a printing device. The printing device includes a curing device, a head, and the controller. The curing device includes a light emitting member having a light source configured to emit light to cure liquid on a printing medium. The light source and the printing medium are configured to be located with a gap therebetween. The gap is variable among a plurality of distances including a first distance and a second distance greater than the first distance. The head has a nozzle configured to eject liquid to the printing medium. The control device configured to perform: in a case that a nozzle gap between the nozzle and the printing medium is smaller than a third distance, controlling the light source to emit light of an intensity based on the gap so that the intensity when the gap is the second distance is greater than when the gap is the first distance; and in a case that the nozzle gap is greater than or equal to the third distance, preventing the nozzle from ejecting liquid and preventing the light source from emitting the light.

According to another aspect, the disclosure provides a curing device. The curing device includes a light emitting member, a lens and a controller. The light emitting member has a light source configured to emit light to cure liquid on a printing medium. The lens is located between the printing medium and the light source. The light emitted from the light source passes through the lens. A gap between the printing medium and a focal point of the light which is emitted from the light source and passes through the lens being variable among a plurality of distances including a first distance and a second distance greater than the first distance. The control device is configured to perform: controlling the light source to emit light of an intensity based on the gap so that the intensity when the gap is the second distance is greater than when the gap is the first distance.

According to another aspect, the disclosure provides a printing device. The printing device includes a curing device, a head, and a control device. The curing device includes a light emitting member, and a lens. The light emitting member has a light source configured to emit light to cure liquid on a printing medium. The lens is located between the printing medium and the light source. The light emitted from the light source passes through the lens. A gap between the printing medium and a focal point of the light which is emitted from the light source and passes through the lens being variable among a plurality of distances including a first distance and a second distance greater than the first distance. The head has a nozzle configured to eject liquid to the printing medium. The control device is configured to perform: controlling the light source to emit light of the intensity based on the gap so that the intensity when the gap is the second distance is greater than when the gap is the first distance. According to the aspects described above, the illuminance of light on the printing medium can be adjusted by controlling the light intensity. The curing device or the printing device need not be provided with structures and the like for moving the light emitting member vertically, thereby suppressing an increase in the cost of the curing device and suppressing a decline in image quality caused by the shape of the printing medium.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Figure 1:
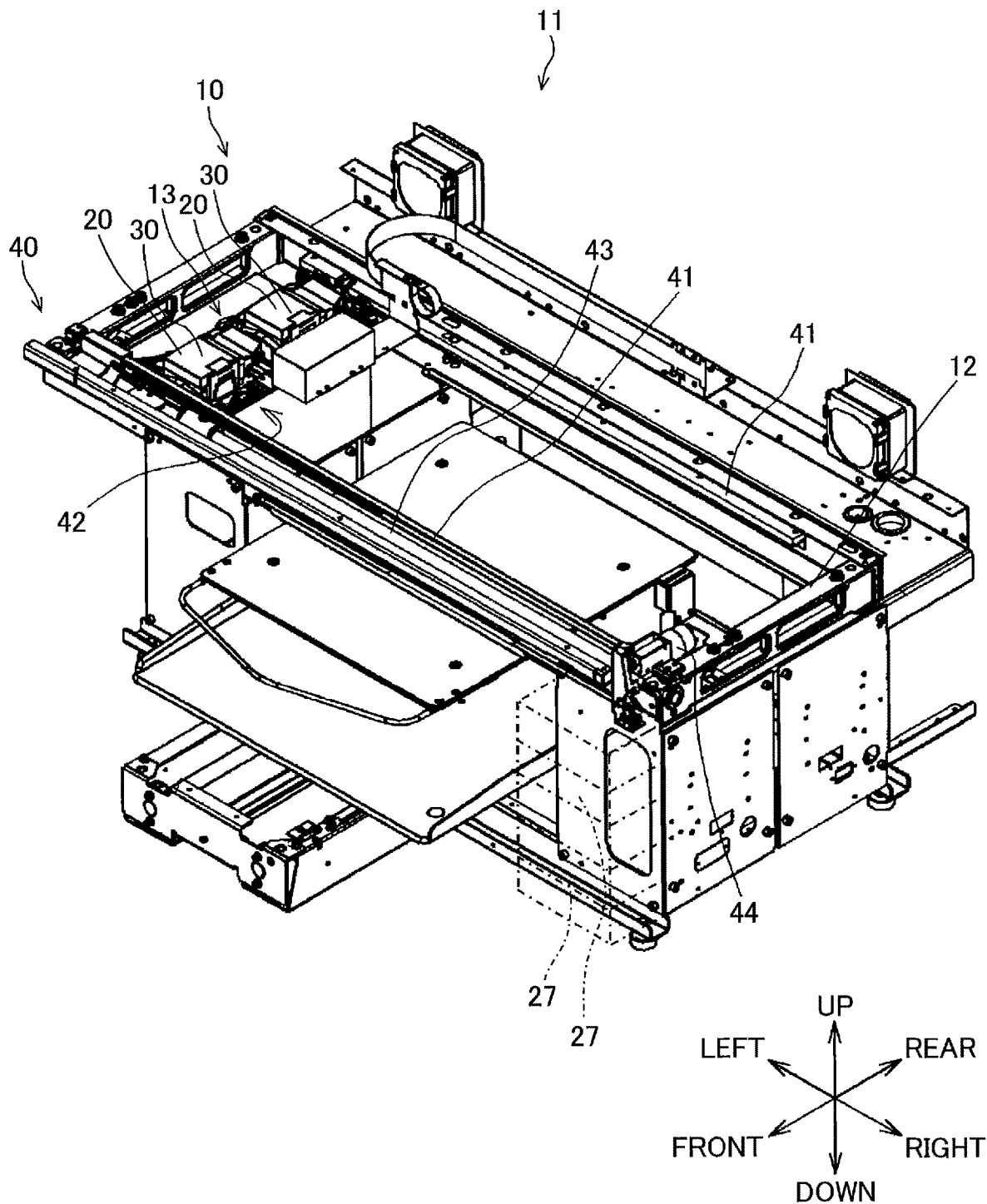
FIG. 1 is a perspective view of a printing device provided with a curing device.

An embodiment will be described while referring to the accompanied drawings, wherein like parts and components are designated with the same reference numerals to avoid duplicating description.

First Embodiment

Structure of a Printing Device

FIG. 1 shows a printing device 11 provided with a curing device 10 according to a first embodiment of the present disclosure. In this example, the printing device 11 is an inkjet printer that prints images by ejecting liquid from a recording head 20 onto a printing medium A (see FIG. 2) and irradiating the printing medium A with light emitted from a light emitting member 30. The printing medium A may be a three-dimensional object, such as a bowl or a mug. The liquid is a photocurable liquid such as an ink that is cured by ultraviolet or infrared light, for example.

Figure 2:
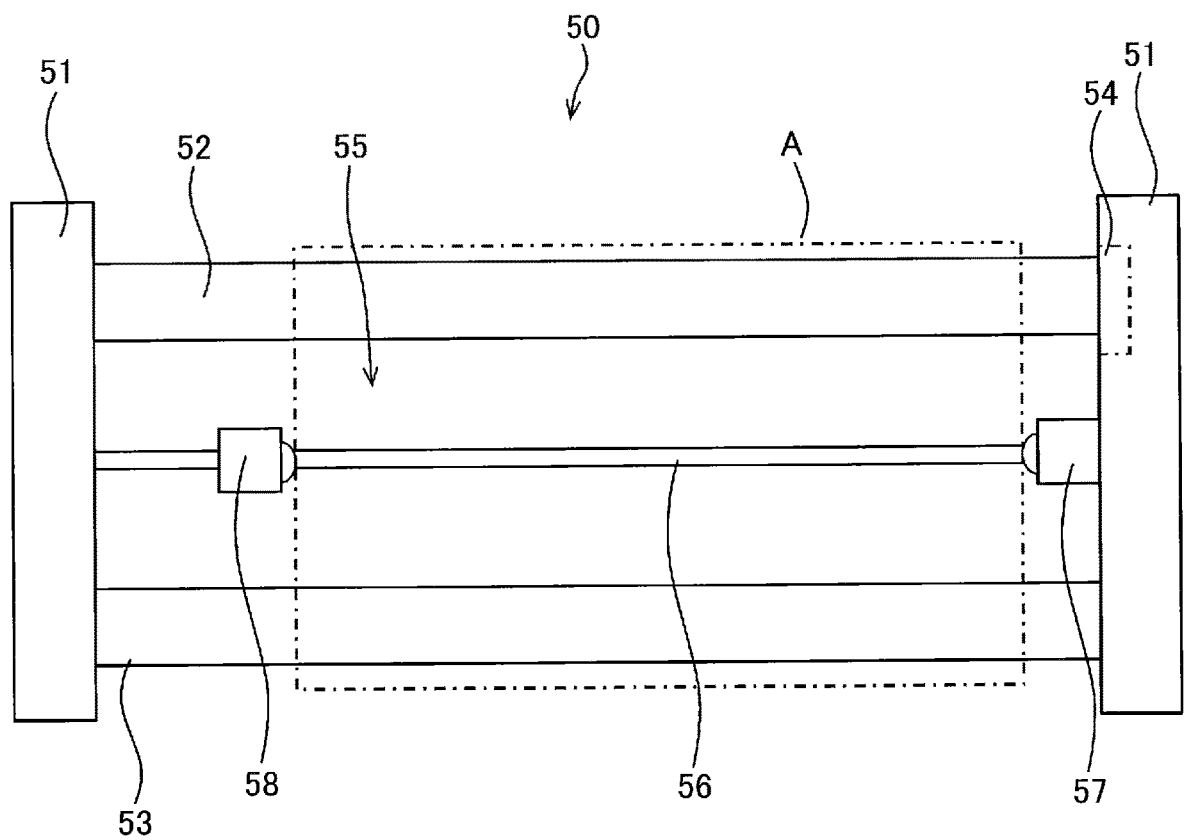
FIG. 2 is a schematic diagram of a conveying device viewed from the above.
Figure 2:
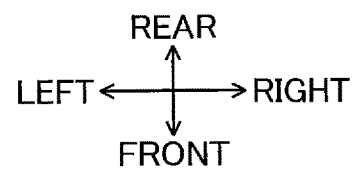

The printing device 11 is provided with a curing device 10, a recording head 20, and a conveying device 50 (see FIG. 2). The curing device 10 is provided with a light emitting member 30, a scanning member 40, an enclosure 12, and a control device 60 (see FIG. 5). The enclosure 12 houses the curing device 10, the recording head 20, and the conveying device 50. The recording head 20 and the light emitting member 30 are integrally provided as a head unit 13, for example. Details of the conveying device 50 and control device 60 will be described later.

Further, the direction in which the printing medium A and the light emitting member 30 are aligned will be called the up-down direction (or vertical direction). The direction in which the scanning member 40 scans the light emitting member 30 relative to the printing medium A, which is a direction orthogonal to this direction of alignment, will be called the left-right direction. The direction orthogonal to both the direction of alignment and the scanning direction will be called the front-rear direction. However, the layout of the curing device 10 and the printing device 11 is not limited to this example.

The scanning member 40 moves the head unit 13 in the left-right direction. The scanning member 40 has a pair of scanning rails 41, a carriage 42, a drive belt 43, and a scanning motor 44. The scanning rails 41 are elongated members extending in the left-right direction. The scanning rails 41 are arranged parallel to each other with one on either side of the head unit 13 in the front-rear direction.

The carriage 42 supports the head unit 13 and is itself supported on the scanning rails 41 so as to be movable in the left-right direction along the same. The drive belt 43 is an endless belt extending in the left-right direction along the scanning rails 41. The drive belt 43 is connected to the carriage 42 and is coupled to the scanning motor 44 via a pulley. By driving the drive belt 43, the scanning motor 44 reciprocates the carriage 42 in the left-right direction along the scanning rails 41. In this way, the scanning member 40 moves the recording head 20 and the light emitting member 30 relative to the printing medium A in the left-right direction.

Conveying Device

Figure 3A:
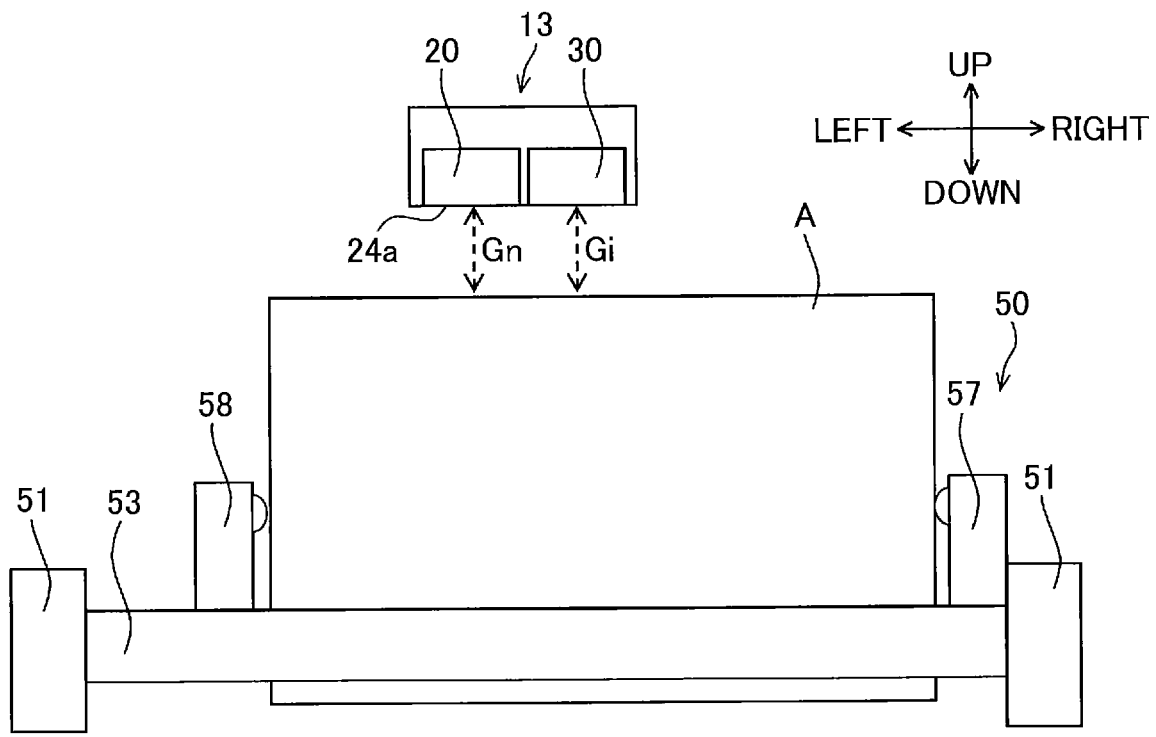
FIG. 3A is a schematic diagram of the conveying device shown in FIG. 2 viewed from the front.
Figure 3B:
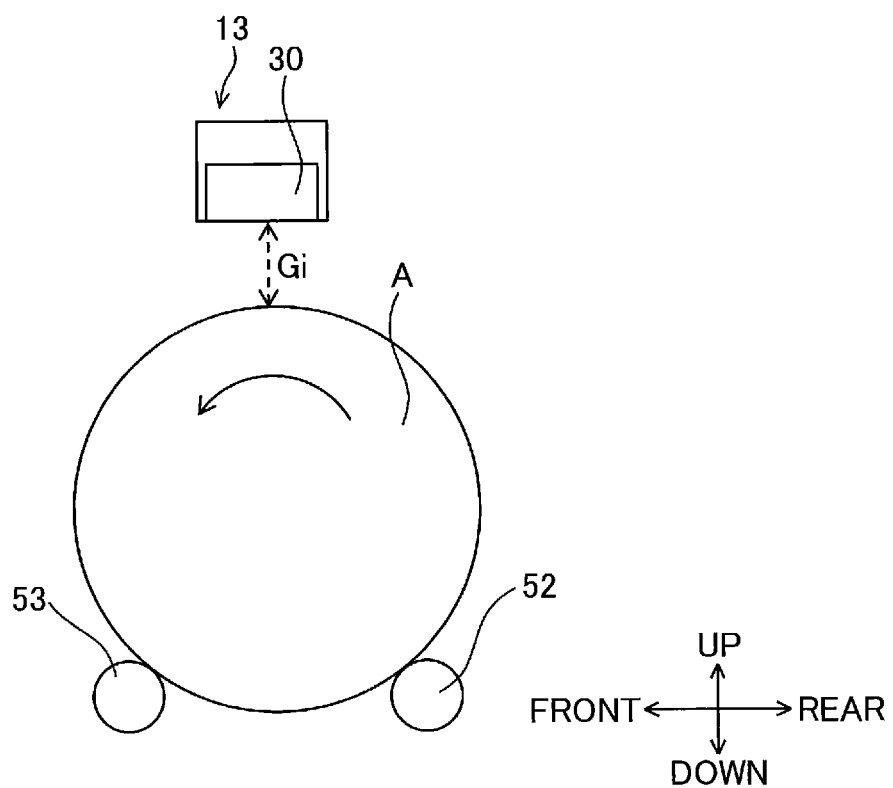
FIG. 3B is a schematic diagram of the conveying device shown in FIG. 2 viewed from the right.

As shown in FIGS. 2, 3A, and 3B, the conveying device 50 has a pair of frame bodies 51, a drive roller 52, a follow roller 53, a conveying motor 54, and a pressing part 55. The frame bodies 51 have flat plate shapes and are spaced apart in the left-right direction.

The drive roller 52 and the follow roller 53 are columnar-shaped and arranged with their central axes extending in the left-right direction. The drive roller 52 and the follow roller 53 are mounted in the pair of frame bodies 51 so as to be rotatable about their central axes. The drive roller 52 and the follow roller 53 are arranged parallel to each other and are spaced apart from each other in the front-rear direction. The drive roller 52 and the follow roller 53 are arranged at the same height in the up-down direction. The gap between the drive roller 52 and the follow roller 53 is smaller than the dimension of the printing medium A in the front-rear direction. Accordingly, the printing medium A is disposed on top of the drive roller 52 and the follow roller 53 between the pair of frame bodies 51.

Nonslip members formed of an elastic material such as rubber are mounted around the outer surfaces of the drive roller 52 and the follow roller 53. These nonslip members cause the printing medium A placed on the drive roller 52 and the follow roller 53 to rotate along with the rotating drive roller 52 and the follow roller 53.

Further, the printing medium A placed on top of the drive roller 52 and the follow roller 53 is removably mounted in the enclosure 12 (see FIG. 1) and the like so as to oppose the bottom surface of the head unit 13. With this arrangement, the recording head 20 of the head unit 13 can eject liquid onto the printing medium A and the light emitting member 30 can irradiate the printing medium A with light.

The conveying motor 54 is disposed in one of the frame bodies 51, for example, and is coupled with the drive roller 52. When the conveying motor 54 rotates the drive roller 52, the drive roller 52 rotates the printing medium A and the follow roller 53 is rotated by the printing medium A. Through this rotation, an area of the printing medium A opposing the bottom surface of the head unit 13 moves to the downstream in the direction of rotation of the printing medium A with the opposing area being replaced by an area of upstream in the direction of rotation of the printing medium A, for example.

As shown in FIGS. 2 and 3A, the pressing part 55 has a conveying rail 56, a fixed part 57, and a movable part 58. The conveying rail 56 extends in the left-right direction and is disposed between the drive roller 52 and the follow roller 53 in the front-rear direction. The conveying rail 56 spans between the pair of frame bodies 51, and is with the ends fixed to the frame bodies 51. The fixed part 57 on the right end of the conveying rail 56 is fixed to the right frame body 51. The movable part 58 is mounted on the conveying rail 56 to the left of the fixed part 57 and is movable in the left-right direction.

The fixed part 57 and the movable part 58 extend upward from the conveying rail 56. A ball is rotatably provided on the upper end of each of the fixed part 57 and the movable part 58 in the surfaces thereof that oppose each other. With this configuration, the printing medium A is interposed between the fixed part 57 and the movable part 58 in the left-right direction and the balls of the fixed part 57 and the movable part 58 contact the printing medium A. The fixed part 57 and the movable part 58 rotatably support the printing medium A via these balls.

Specifically, the printing medium A is placed on the drive roller 52 and the follow roller 53 between the fixed part 57 and the movable part 58 and is shifted rightward until the right end of the printing medium A contacts the fixed part 57. Next, the movable part 58 is moved rightward until the movable part 58 contacts the left end of the printing medium A. Through this arrangement, the printing medium A is supported by the fixed part 57 and the movable part 58 in the left-right direction and rotated by the drive roller 52 and the follow roller 53.

Head Unit

Figure 4:
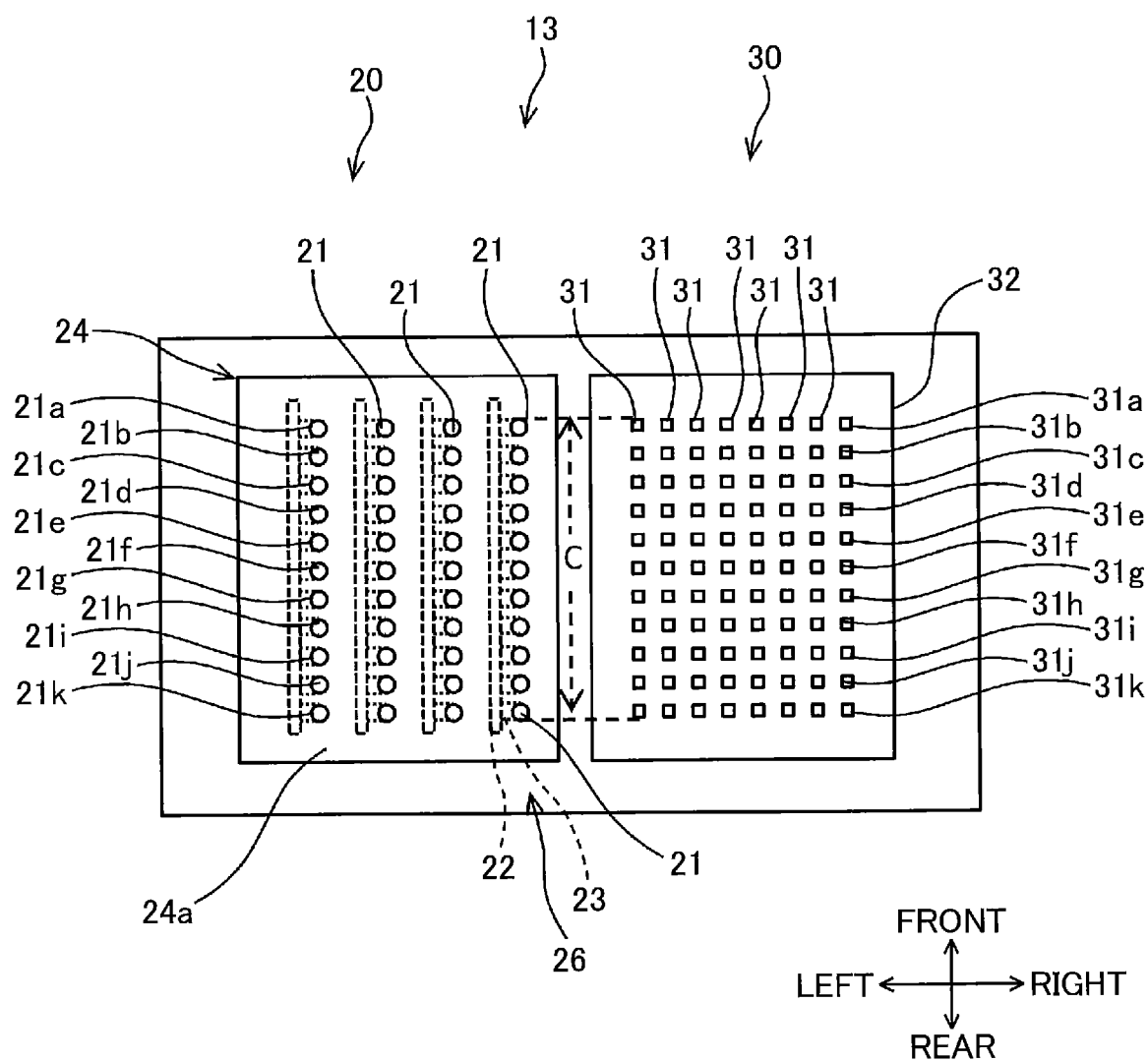
FIG. 4 is a schematic diagram of a head unit viewed from the below.

As shown in FIG. 4, the recording head 20 and the light emitting member 30 in the head unit 13 are juxtaposed in the left-right direction. The recording head 20 has a plurality of nozzles 21, a plurality of liquid channels 26, a channel-forming body 24, and a plurality of drive elements 25 (see FIG. 5). A predetermined number of the plurality of nozzles 21 are arranged at regular intervals in the front-rear direction to form a nozzle row. The plurality of nozzle rows is juxtaposed at regular intervals in the left-right direction.

The channel-forming body 24 has a rectangular parallelepiped shape, for example. The nozzles 21 and the liquid channels 26 are formed inside the channel-forming body 24. The channel-forming body 24 has a nozzle surface 24a as a bottom surface thereof. The nozzles 21 are openings formed in the nozzle surface 24a. The liquid channels 26 connect nozzles 21 to liquid tanks 27 (see FIG. 1). The liquid channel 26 includes a common channel 22, and a plurality of individual channels 23 for each nozzle row. The common channels 22 extend in the front-rear direction, and a plurality of the individual channels 23 branches off from each common channel 22. The upstream ends of the individual channels 23 are connected to the corresponding common channel 22, while the downstream ends are connected to nozzles 21. Accordingly, liquid flows into the common channels 22 from corresponding liquid tanks 27, and the liquid flowing through the common channels 22 in the front-rear direction is distributed among the individual channels 23 to be supplied to the nozzles 21.

The drive elements 25 are provided in correspondence with the individual channels 23. The drive elements 25 are piezoelectric elements, heating elements, or electrostatic actuators, for example. When driven, the drive elements 25 modify the volume of the corresponding individual channels 23. This action increases pressure in the liquid accommodated in the individual channels 23, causing liquid to be ejected from the corresponding nozzles 21.

The light emitting member 30 is disposed upstream of the recording head 20 in the direction that the recording head 20 moves while ejecting liquid. In a case that the printing device 11 in this example is a device for performing unidirectional printing, the recording head 20 ejects liquid while moving leftward but does not eject liquid while moving rightward. In this case, the light emitting member 30 is disposed on the right side of the recording head 20, i.e., the upstream side of the recording head 20 when the recording head 20 moves leftward for printing. As the recording head 20 ejects liquid onto the printing medium A, the light emitting member 30 follows the recording head 20, and emits light onto the liquid deposited on the printing medium A.

In a case that the printing device 11 is a device for performing bidirectional printing, the printing device 11 is provided with a pair of light emitting members 30 arranged on opposite sides of the recording head 20 in the left-right direction. When the recording head 20 ejects liquid onto the printing medium A while moving leftward, the right-side light emitting member 30 follows the recording head 20 and emits light onto the liquid deposited on the printing medium A. Similarly, when the recording head 20 ejects liquid on the printing medium A while moving rightward, the left-side light emitting member 30 follows the recording head 20 and emits light onto the liquid deposited on the printing medium A.

The light emitting member 30 has a plurality of light sources 31, and a circuit board 32 on which the light sources 31 are mounted. The circuit board 32 has a flat rectangular shape and is formed of an insulating material, for example. The light sources 31 are mounted on the bottom surface of the circuit board 32. A predetermined number of the plurality of light sources 31 are aligned in the front-rear direction to form a light source row. The plurality (e.g., eight) of light source rows is arranged at intervals in the left-right direction. The light sources 31 are light-emitting elements, such as LEDs. When driven by the control device 60, the light sources 31 emit light (e.g., ultraviolet or infrared light) for curing liquid ejected from the nozzles 21.

As an example of this type of head unit 13, each nozzle row has eleven nozzles 21 aligned in the front-rear direction, and each light source row has eleven light sources 31 aligned in the front-rear direction. The eleven nozzles 21 include nozzles 21a-21k arranged in order from the front side, and the eleven light sources 31 include light sources 31a-31k arranged in order from the front side. The light source 31a, which corresponds to the nozzle 21a, is aligned with the nozzle 21a in the left-right direction and emits light onto liquid ejected onto the printing medium A from the nozzle 21a. Similarly, the light sources 31b-31k respectively correspond to the nozzles 21b-21k.

Control Device

Figure 5:
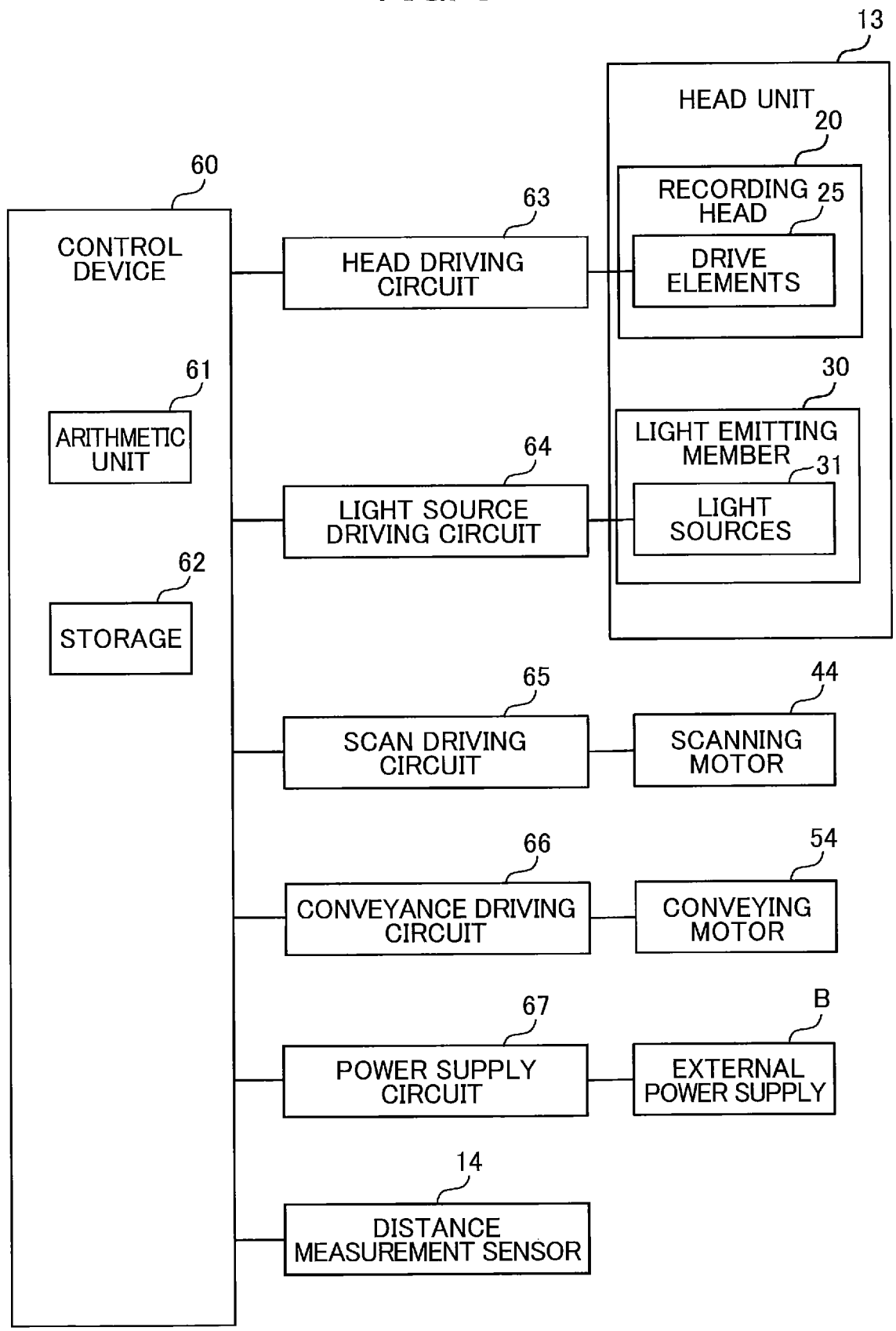
FIG. 5 is a block diagram illustrating functional configurations of the printing device shown in FIG. 1.

As shown in FIG. 5, the control device 60 has an arithmetic unit 61, and a storage 62. The storage 62 is memory accessible to the arithmetic unit 61 and is configured of RAM, ROM, and the like. The RAM temporarily stores various data, such as print data. The ROM stores programs for performing various data processes. Note that the control device 60 may be a single control device performing centralized control or may include a plurality of control devices performing distributed control. Alternatively, the programs may be stored in storage media different from the storage 62. The programs may further be stored on a single storage medium or may be divided up among a plurality of storage media.

The arithmetic unit 61 is configured of electronic circuitry that includes a processor, such as a CPU, and an integrated circuit, such as an ASIC. By executing programs stored in ROM, the arithmetic unit 61 controls the drive elements 25, the light sources 31, the scanning motor 44, and the conveying motor 54 to execute a printing process. In a printing process, the control device 60 controls light sources 31 so that the light intensity emitted (outputted) from the light source 31 is greater as the corresponding light source gaps Gi becomes larger (see FIG. 8). Here, a light source gap Gi is the vertical clearance between a light source 31 and the printing medium A for each of the plurality of light sources 31 in the light emitting member 30. The details of this control will be described later.

The control device 60 is connected to the drive elements 25 via a head driving circuit 63 and controls the drive of the drive elements 25 via the head driving circuit 63. The control device 60 is connected to the light sources 31 via a light source driving circuit 64 and controls the drive of the light sources 31 via the light source driving circuit 64. The control device 60 is connected to the scanning motor 44 via a scan driving circuit 65 and controls the drive of the scanning motor 44 via the scan driving circuit 65. The control device 60 is connected to the conveying motor 54 via a conveyance driving circuit 66 and controls the drive of the conveying motor 54 via the conveyance driving circuit 66.

The control device 60 is also connected to an external power supply B via a power supply circuit 67. The external power supply B is a commercial power supply, for example. The power supply circuit 67 converts the power supplied from the external power supply B from alternating current to direct current, and/or converts the voltage, frequency, or the like, for example. The power supply circuit 67 supplies the converted power to components in the printing device 11 including the drive elements 25, the light sources 31, the scanning motor 44, and the conveying motor 54. The control device 60 controls this power conversion. The control device 60 is connected to a distance measurement sensor 14 described later.

Printing Process

In the printing device 11 having this configuration, the control device 60 acquires print data and executes a printing process based on the print data. The print data includes image data (e.g., raster data) representing an image to be printed on the printing medium A. The print data may be stored in the storage 62 or may be acquired from an external device such as a network, a computer, or a storage medium.

The control device 60 executes a scanning operation by controlling the scanning motor 44 to move the head unit 13 in the left-right direction. The control device 60 also executes an ejection operation by controlling the drive elements 25 to eject liquid from the recording head 20. The control device 60 also executes a light irradiating operation by controlling the light sources 31 to emit light. The control device 60 also executes a conveying operation to convey the printing medium A by controlling the conveying motor 54 to rotate the printing medium A. One scan includes a scanning operation, an ejection operation, and a light irradiating operation. The printing device 11 performs the printing process by repeatedly alternating between a scan and a conveying operation.

That is, in a scan the recording head 20 moves leftward while liquid is ejected from the nozzle surface 24a of the recording head 20, as illustrated in FIG. 3A. As a result, the liquid impacts the area of the printing medium A opposing the nozzle surface 24a. At the same time, the light emitting member 30 moves leftward behind the recording head 20 and emits light from the light sources 31. Through this operation, light is emitted on the liquid deposited in the areas of the printing medium A that oppose the light emitting member 30. The liquid is cured by this light and fixed to the printing medium A as a result. In this way, an image extending in the left-right direction is printed in the opposing area of the printing medium A.

Next, the control device 60 executes a conveying operation to rotate the printing medium A counterclockwise when viewed from the right side, as illustrated in FIG. 3B. Through this conveying operation, the area of the printing medium A on which the image was just printed is moved forward so that the area behind this printed area becomes the new opposing area that opposes the head unit 13. Subsequently, another scan is performed to print an image in this new opposing area. By repeatedly printing an image in the opposing area through a scan and then shifting the opposing area of the printing medium A, the control device 60 forms images sequentially in the circumferential direction of the printing medium A.

Light Intensity

As shown in FIG. 3A, a columnar-shaped printing medium A is placed on the drive roller 52 and the follow roller 53 such that its central axis is oriented in the left-right direction, for example. In this case, the light source gap Gi, which is the distance between a light source 31 of the light emitting member 30 and the printing medium A remains constant even as the light emitting member 30 moves in the left-right direction.

Figure 8:
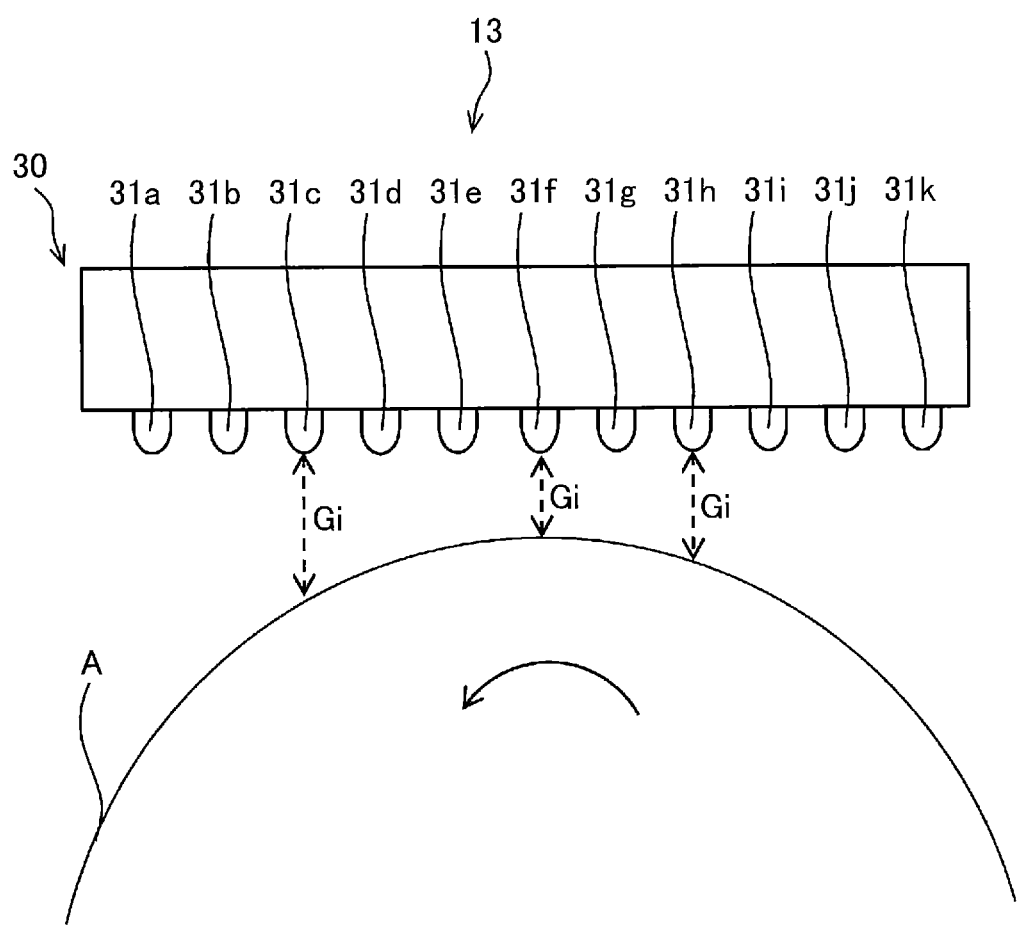
FIG. 8 is a schematic diagram illustrating a light emitting member and the printing medium viewed from the right.

However, since the printing medium A has a curve deviated from the front-rear direction, as illustrated in FIGS. 3B and 8, the light source gap Gi varies among light sources 31 of the light emitting member 30 that are aligned in the front-rear direction. As a result, when the same light intensity is emitted from all the light sources, the illuminance of light on the printing medium A produced by light emitted from the light emitting member 30 grows smaller as the light source gap Gi increases. Therefore, in the embodiment, the control device 60 controls the light source 31 to emit a higher light intensity when the light source gap Gi is a second distance than when the light source gap Gi is the first distance. Here, the second distance is greater than a first distance. For example, the first distance indicates a clearance less than a predetermined distance, while the second distance is a clearance greater than or equal to the predetermined distance and, hence, greater than the first distance. In other words, the light source gap Gi is classified into one of the first distance and the second distance by using the predetermined distance as a threshold. As described above, the control device 60 adjusts an intensity of light emitted from the light source 31 based on the corresponding light source gap Gi of the light source 31 so that the intensity increases as the light source gap Gi increases.

The light source gap Gi is the clearance between a light source 31 and the printing medium A. For example, the light source gap Gi is the distance between a light source 31 and the point on the printing medium A opposing the light source 31 in a direction parallel to the optical axis of the light emitted from the light source 31. The light source gaps Gi are acquired from shape information, for example. Shape information is information specifying the shape, such as the dimensions, of the printing medium A. The shape information may be acquired from dimension data inputted from the storage 62 or an external device or may be acquired from the distance measurement sensor 14 (see FIG. 5), for example.

For a columnar-shaped printing medium A, for example, dimension data includes the diameter of the printing medium A and the length of the printing medium A in the left-right direction. Positional relationships, such as the distance between each nozzle 21 of the recording head 20 in the printing device 11 and the conveying device 50 and between each light source 31 of the light emitting member 30 in the printing device 11 and the conveying device 50 are predetermined, and stored in the storage 62 in advance. The diameters of the drive roller 52 and the follow roller 53 in the conveying device 50 and the distance between them are also predetermined and stored in the storage 62 in advance.

Figure 7:
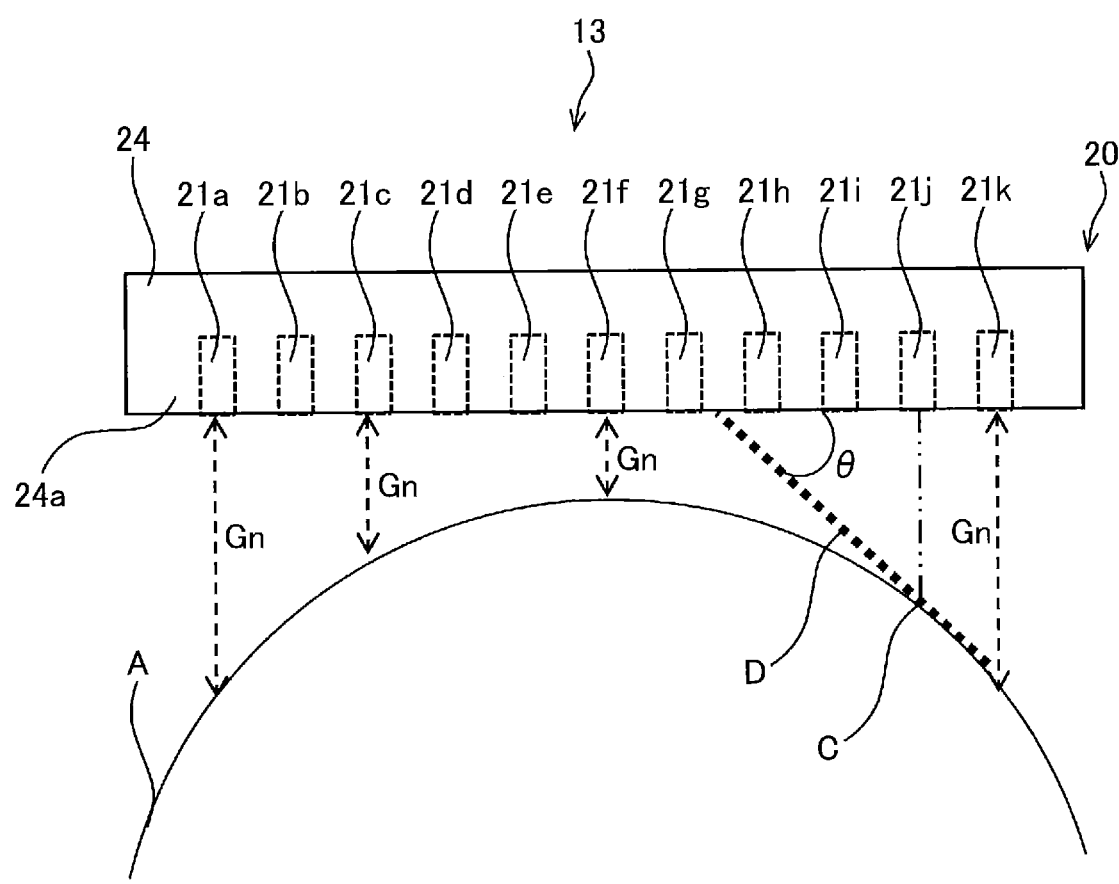
FIG. 7 is a schematic view of a recording head and the printing medium viewed from the right.
Figure 7:
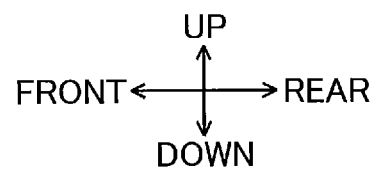

Based on this dimension information, the control device 60 can obtain the position of the printing medium A placed on the drive roller 52 and the follow roller 53, and the light source gaps Gi described above and nozzle gaps Gn between the nozzles 21 and this printing medium A. As shown in FIG. 7, a nozzle gap Gn is the clearance between a nozzle 21 open in the nozzle surface 24a of the recording head 20 and the corresponding position on the printing medium A vertically opposing that nozzle 21.

The distance measurement sensor 14 (FIG. 5) measures the distance to an object and the like based on changes in the quantity of outputted light reflected off the object, and outputs measured values to the control device 60. The distance measurement sensor 14 is disposed at a predetermined position on the enclosure 12, the head unit 13, or the like and measures the distance from this predetermined position to the printing medium A placed on the drive roller 52 and the follow roller 53. The distances from this predetermined position to each nozzle 21 and each light source 31 are prestored in the storage 62. Based on this information, the control device 60 can obtain the nozzle gaps Gn and the light source gaps Gi.

The light sources 31 are light-emitting elements whose emitted light varies in intensity according to the amount of power supplied thereto. That is, the lower the amount of power supplied to a light source 31, the less intensity the emitted light has. One light source 31 emits the same intensity of light as the other light sources 31 when the same amount of power is supplied to each. Control of the light sources 31 includes PWM control to reduce the intensity of light, for example.

The intensity of light emitted from a light source 31 indicates the radiant flux emitted from a unit area of the light source 31 per unit time, such as the radiant exitance (mW/cm$^2$). In contrast, the illuminance on the printing medium A (mW/cm$^2$) of light emitted from a light source 31 is the radiant flux per unit area on the printing medium A of light emitted from the light source 31 per unit time. The total light intensity is the product of illuminance (mW/cm$^2$) and the light irradiation time (s), which constitutes the energy (mJ/cm$^2$) of light incident on the printing medium A per unit area.

Control Method of the Printing Device

Figure 6:
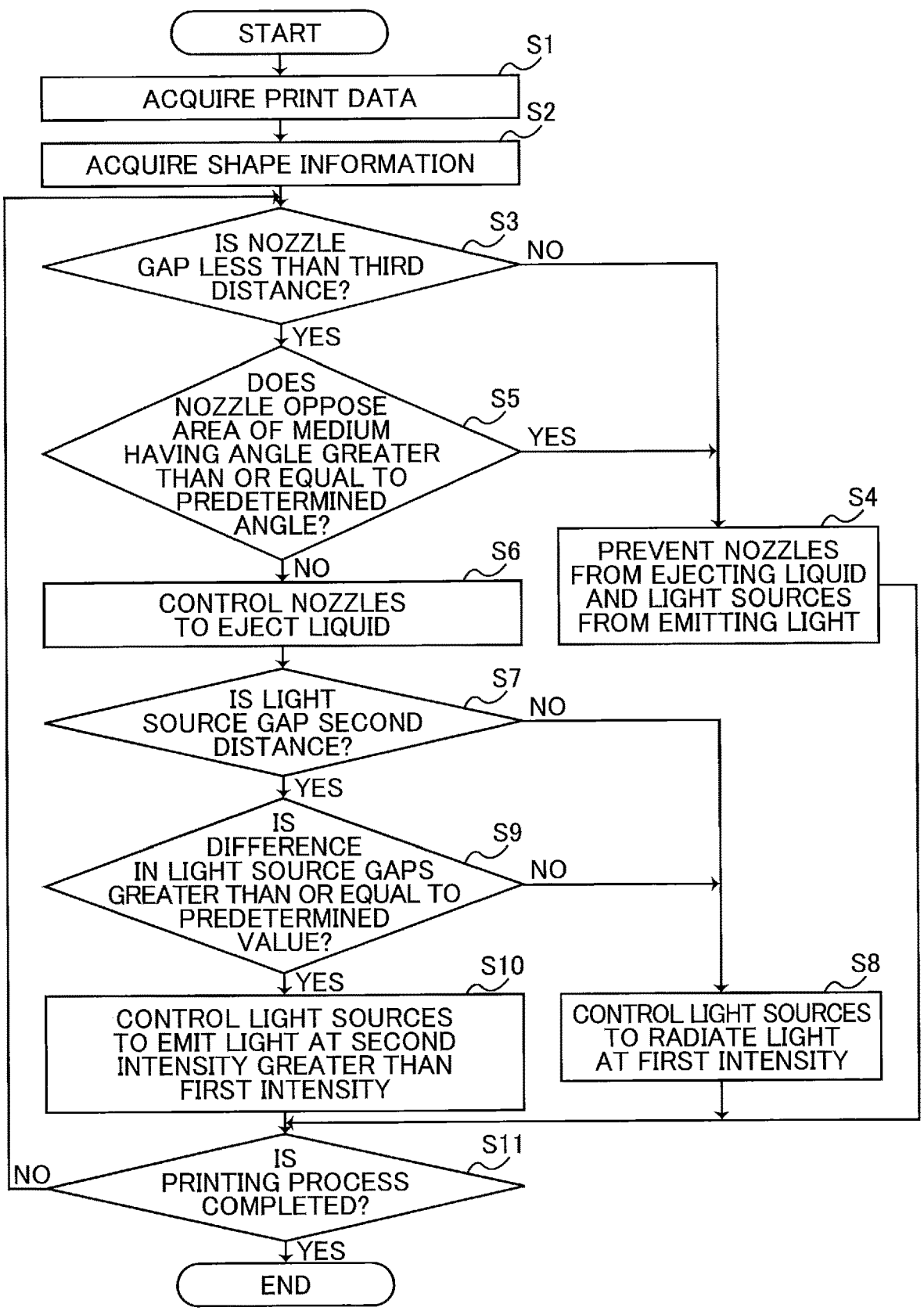
FIG. 6 is a flowchart illustrating a control method of the printing device shown in FIG. 1.

The control method of the printing device 11 is executed by the control device 60 according to the flowchart in FIG. 6, for example. In S1 of FIG. 6, the control device 60 acquires print data and begins a printing process based on the print data. In S2 the control device 60 also acquires shape information and based on this shape information obtains the nozzle gap Gn for each nozzle 21 and the light source gap Gi for each light source 31. The detection results of the measurement sensor 14 may be used for obtaining the nozzle gaps Gn and the light source gaps Gi.

In S3 the control device 60 determines for each nozzle 21 whether the nozzle gap Gn is less than a predetermined third distance. In the example shown in FIG. 7, the center nozzle 21f among the eleven nozzles 21 aligned in the front-rear direction is arranged so as to overlap the central axis of the columnar-shaped printing medium A when viewed from above. In this case, the nozzle gap Gn for the center nozzle 21f is the smallest of the nozzle gaps Gn among the eleven nozzles 21, and the nozzle gap Gn increases as the position thereof is separated from this center in both front and rear directions. Thus, the nozzle gap Gn is largest for the end nozzles 21a and 21k.

As an example, the control device 60 may determine that the nozzle gap Gn is greater than or equal to the third distance for the front-end nozzle 21a and the rear-end nozzle 21k (S3: NO). In these cases, in S4 the control device 60 prevents the nozzles 21a and 21k whose nozzle gap Gn is greater than or equal to the third distance from ejecting liquid, and prevents the corresponding light sources 31a and 31k from emitting light. Thereafter, the control device 60 advances to the process of S11.

The areas of the printing medium A that vertically oppose the end nozzles 21a and 21k have a large slope relative to the nozzle surface 24a. Consequently, in a conceivable case that liquid is ejected from the end nozzles 21a and 21k in this situation, the liquid might may run off the printing medium A. Hence, by not ejecting liquid and not irradiating light on areas of the printing medium A having such a large nozzle gap Gn, the control device 60 can suppress a drop in image quality caused by the liquid while reducing power consumption.

On the other hand, the control device 60 determines that the nozzle gap Gn is less than the third distance for the other nine interior nozzles 21b-21j (S3: YES). Next, in S5 the control device 60 determines whether the nozzle 21 vertically opposes an area of the printing medium A having an angle θ relative to the nozzle surface 24a that is greater than or equal to a predetermined angle.

As shown in FIG. 7, the angle θ is the smaller of the two angles formed by the flat nozzle surface 24a, which is orthogonal to the vertical direction, and a tangent D at a position C on the printing medium A vertically aligned with the corresponding nozzle 21. At the center of the printing medium A in the front-rear direction, the nozzle surface 24a and the tangent D are parallel to each other. The farther away from the center of the printing medium A in front and rear directions, the greater the angle θ of the tangent D relative to the nozzle surface 24a. Among the nine interior nozzles 21 (21b-21j), the angle θ formed by the nozzle surface 24a and the tangent D at the corresponding position C on the printing medium A is greater than or equal to the predetermined angle for each of the front-end nozzle 21b and the rear-end nozzle 21j.

Thus, the control device 60 determines that each of the nozzles 21b and 21j vertically opposes an area of the printing medium A whose angle θ with respect to the nozzle surface 24a is greater than or equal to the predetermined angle (S5: YES). In these cases, the control device 60 advances to S4 described above, wherein the control device 60 prevents each of the nozzles 21b and 21j whose angle θ is greater than or equal to the predetermined angle from ejecting liquid and prevents the corresponding light sources 31b and 31j from emitting light. Subsequently, the control device 60 advances to S11.

This process of S5 is performed because liquid ejected onto areas of the printing medium A having a large slope may drip off the printing medium A, even when the nozzle gap Gn is less than the third distance. Hence, by not ejecting liquid and not irradiating light on such areas of the printing medium A, the control device 60 can suppress a drop in image quality from this deposited liquid while reducing power consumption.

On the other hand, the angle θ formed by the nozzle surface 24a and the tangent D at the corresponding position C on the printing medium A is less than the predetermined angle for each of the seven other nozzles 21c-21i among the nine interior nozzles 21 that exclude the end nozzles 21b and 21j. Therefore, the control device 60 determines that each of the nozzles 21c-21i does not vertically oppose an area on the printing medium A having an angle θ with respect to the nozzle surface 24a that is greater than or equal to the predetermined angle (S5: NO). In S6 while moving the recording head 20 leftward, the control device 60 controls the nozzles 21c-21i to eject liquid therefrom based on the print data. Accordingly, liquid ejected from the nozzles 21c-21i impacts the printing medium A.

In S7 the control device 60 determines for each light source 31 whether the light source gap Gi is the second distance. In the example of FIG. 8, the control device 60 obtains the light source gap Gi for each of the light sources 31c-31i corresponding to the nozzles 21c-21i ejecting liquid. In this example, the control device 60 determines that the light source gap Gi is the first distance for light sources 31e-31g, whose light source gap Gi is less than the predetermined distance (S7: NO). The predetermined distance is 10 mm, for example. That is, when a light source gap Gi for a light source 31 is less than the predetermined distance, the control device 60 determines that the light source gap Gi for the light source 31 is the first distance. On the other hand, when a light source gap Gi for a light source 31 is greater than or equal to the predetermined distance, the control device 60 determines the light source gap Gi for the light source 31 is the second distance.

When the light source gap Gi is smaller than the predetermined distance (S7: NO), that is, the light source gap Gi is determined to the first distance, in S8 the control device 60 control the corresponding light sources to emit (output) light therefrom at a predetermined first intensity. In this example, the light source gap for each of the light sources 31e-31g is determined as the first distance, and the light sources 31e-31g emit light at the first intensity. Through this operation, light is emitted onto liquid, fixing the liquid to the printing medium A.

On the other hand, the control device 60 determines that the light source gap Gi is the second distance for each of the light sources 31c, 31d, 31h, and 31i, whose light source gap Gi is greater than or equal to the predetermined distance (S7: YES). Next, in S9 the control device 60 determines whether the difference in the light source gaps Gi for the light sources 31c, 31d, 31h, and 31i whose light source gap Gi is the second distance is greater than or equal to a predetermined value.

Here, the difference in light source gaps Gi is the difference between a first light source gap and a second light source gap. The first light source gap is the light source gap Gi between a first light source and the printing medium A, and the second light source gap is the light source gap Gi between a second light source and the printing medium A. The first light source and the second light source are different light sources 31, such as light sources 31 juxtaposed in the front-rear direction. In the example of FIG. 8, the first light source and the second light source are one of the light sources 31a-31k. For example, the first light source is one of the light sources 31e-31g whose light source gap Gi is determined as the first distance. In this example, the first light source is the light source 31f whose light source gap Gi is smallest among all the light source gaps Gi determined as the first distance. Further, in this example, the second light source is each of the light sources 31c, 31d, 31h, and 31i whose light source gaps Gi are determined as the second distance. In this case, the control device 60 calculates the difference between the second light source gap, which is the light source gap Gi for each of the light sources 31c, 31d, 31h, and 31i, and the first light source gap, which is the light source gap Gi for the light source 31f. Here, the light source 31 nearest the second light source among the light sources 31e-31g having light source gaps Gi of the first distance may be used as the first light source.

When the control device 60 determines that the difference in light source gaps Gi is less than the predetermined value for the light sources 31d and 31h (S9: NO), in S8 the control device 60 controls the light sources 31d and 31h to emit light therefrom at the first intensity. In this way, the intensity of light emitted from the light sources 31d and 31h is made equal to the intensity of light emitted from the first light source when the difference from the first light source gap of the first light source is small, even when the second light source gap for the second light sources 31d and 31h is large. This method can create uniform conditions for curing liquid with light.

On the other hand, when the control device 60 determines that the difference in light source gaps Gi is greater than or equal to the predetermined value for the light sources 31c and 31i (S9: YES), in S10 the control device 60 controls the light sources 31c and 31i to emit light at the second intensity, which is greater than the first intensity. In this way, the intensity of light emitted (outputted) from the light sources 31c and 31i is set greater than the intensity of light emitted from the first light source when the difference between the second light source gap of the second light sources 31c and 31i and the first light source gap of the first light source is large. This method ensures that the liquid is cured.

In S11 the control device 60 determines whether the process for printing the print data has been completed. When there remains the process for printing the print data (S11: NO), the control device 60 returns to S3 and repeats the process described above. For example, there remains such a process for a remaining part of the printing medium A, the control device 60 moves the printing medium A forward and again the process of S3. Once the printing process has been completed for the print data (S11: YES), the control device 60 ends the process of FIG. 6.

The process shown in FIG. 6 is just an example, and modifications can be made thereto. For example, a plurality of steps may be executed in parallel, or the order in which the processes are performed may be modified in any way that does not produce any inconsistencies in the processes. Further, one or more steps may be omitted.

For example, at first, determinations (S3, S5) for branch to S4 or S6 are made for each of the nozzles 21, and determinations (S7, S9) for branch to S8 or S10 are made for each of the light sources 31. The determinations S9 are made for all the light sources 31 whose light source gaps Gi are determined as the second distance, after the determinations of S7 are made for all the light sources 31.

Next, the control device 60 performs the process of S6. That is, while moving the recording head 20 leftward, the control device 60 controls the nozzles 21, which are determined to eject liquid in the above-described determinations, to actually eject liquid. At the same time, the control device 60 performs the process of S4. That is, the control device 60 prevents the nozzles 21, which are determined not to eject liquid in the above-described determinations (S3, S5), from ejecting liquid. The control device 60 also prevents the light sources 31 corresponding to the nozzles 21, which do not eject liquid, from emitting light.

In parallel to the process of S6, the control device performs the process of S10. That is, while moving the recording head 20 leftward, the control device 60 controls the light sources 31, which are determined to emit light at the first intensity in the above-described determinations (S7, S9), to actually emit the light at the first intensity toward liquid on the printing medium A ejected from the corresponding nozzles 21. At the same time the control device 60 performs S8. That is, the control device 60 controls the light sources 31, which are determined to emit light at the second intensity, to actually emit light at the second intensity toward liquid on the printing medium A ejected from the corresponding nozzles 21. Accordingly, the controller 60 performs one scan by ejecting liquid and irradiating light while moving the recording head 20 leftward.

Operations and Effects

The curing device 10 is provided with the light emitting member 30 and the control device 60. The light emitting member 30 has light sources 31 that emit light for curing liquid on the printing medium A. The control device 60 controls each light source 31 to emit light of a greater intensity when the light source gap Gi between the light source 31 and the printing medium A is the second distance than when the light source gap Gi is the first distance. Here, the second distance is greater than the first distance.

Here, the illuminance of light on the printing medium A drops as the light source gap Gi grows larger when the intensity of light emitted from the light source 31 remains constant. However, the control device 60 sets the intensity of light higher when the light source gap Gi is the larger second distance than the intensity of light when the light source gap Gi is the smaller first distance. As a result, the illuminance of light on the printing medium A remains uniform, creating uniform conditions for curing liquid on the printing medium A with light and suppressing a drop in printing quality due to the shape of the printing medium A.

Further, the illuminance of light on the printing medium A is adjusted by controlling the light intensity. Accordingly, the curing device 10 need not be provided with structures and the like for moving the light emitting member 30 vertically, thereby suppressing an increase in the cost of the curing device 10.

The light sources 31 in this curing device 10 include a first light source and the second light sources that differ from the first light source. The control device 60 moves the light emitting member 30 relative to the printing medium A in the scanning direction while controlling the light sources 31 to emit a greater light intensity from the second light sources than the intensity of light emitted from the first light source when the first light source gap, which is the light source gap Gi between the first light source and the printing medium A, is the first distance and the second light source gap, which is the light source gap Gi between the second light sources and the printing medium A, is the second distance.

In this way, the intensity of light emitted from each light source 31 whose light source gap is the second distance is set higher than the intensity of light emitted from light sources 31 whose light source gaps are the first distance when light is emitted from a plurality of light sources 31 in the light emitting member 30 while the light emitting member 30 is scanned. Controlling the intensity of light emitted from a plurality of light sources 31 based on their light source gaps Gi in a light irradiating operation can suppress a decline in image quality due to the shape of the printing medium A while also suppressing an increase in cost.

In this curing device 10, the scanning member 40 has the carriage 42 that moves in the scanning direction (e.g., the left-right direction) while supporting the light emitting member 30, and the light emitting member 30 has the first light sources and the second light sources juxtaposed in a direction orthogonal to the scanning direction (e.g., the front-rear direction). Even when the light emitting member 30 has a plurality of light sources 31 juxtaposed in the front-rear direction in this way, the curing device 10 can suppress a drop in printing quality due to the shape of the printing medium A while also suppressing an increase in cost.

In this curing device 10, the control device 60 controls the intensity of light emitted from the first light source and the second light source based on the difference between the first light source gap and the second light source gap. When the difference is greater than or equal to a predetermined value, the control device 60 sets a light intensity for the light source 31 whose light source gap Gi is the second distance greater than that for a light source 31 whose light source gap Gi is the first distance among the first light source and the second light source. When the difference is less than the predetermined value, the control device 60 controls the light sources 31 so that the same intensity of light is emitted from the first and second light sources.

For example, even when the first light source gap is the first distance and the second light source gap is the second distance, both the first light source gap and the second light source gap may be near the predetermined distance, which is the threshold between the first and second distances, so that the difference between the first light source gap and the second light source gap is small. In such cases, the conditions for curing liquid with light can be made uniform by emitting light with equivalent intensities from the first light source and the second light source.

The printing device 11 is provided with the curing device 10, and the recording head 20. The recording head 20 has the plurality of nozzles 21 capable of ejecting liquid onto the printing medium A. When the nozzle gap Gn between a nozzle 21 and the printing medium A is less than the third distance, the control device 60 ejects liquid from the nozzle 21 and emits light onto the printing medium A from the corresponding light source 31. When the nozzle gap Gn is greater than or equal to the third distance, the control device 60 does not eject liquid from the nozzle 21 and does not emit light onto the printing medium A from the corresponding light source 31.

For example, since the nozzle gap Gn is very large at the front and rear sides of the curved printing medium A, liquid ejected onto these areas may drip off the printing medium A. Hence, by not ejecting liquid or irradiating light in these areas, the control device 60 can suppress a drop in image quality caused by deposited liquid while reducing power consumption.

The recording head 20 in the printing device 11 has the nozzle surface 24a, and the nozzles 21 are formed as openings in the nozzle surface 24a. The control device 60 does not eject liquid from nozzles 21 corresponding to areas of the printing medium A having an angle θ relative to the nozzle surface 24a that is greater than or equal to a predetermined angle and does not emit light onto the printing medium A from light sources 31 opposing these areas, even when the nozzle gap Gn is less than the third distance.

That is, when the slope of the printing medium A is large, liquid ejected onto that slope may drip off, even when the nozzle gap Gn is less than the third distance. Hence, by not ejecting liquid or irradiating light onto such areas, the control device 60 can suppress a drop in image quality caused by deposited liquid while reducing power consumption.

First Variation

In the printing device 11 according to a first variation, the third distance is set based on the printing medium A. For example, the third distance is varied according to the type of printing medium A, such as the material and color of the printing medium A, since the ease with which liquid adheres to the printing medium A, the illuminance at which the liquid on the printing medium A cures, and the like differ according to the type of printing medium A.

To this end, correlations between types of printing media A and third distances are stored in the storage 62 in advance. The control device 60 acquires the type of the target printing medium A from the storage 62, an external device, or the like and obtains the third distance corresponding to that type of printing medium A by referencing the stored correlations. In S3 of the process in FIG. 6, for example, the control device 60 determines for each nozzle 21 whether the nozzle gap Gn is less than the obtained third distance.

Second Variation

The curing device 10 according to a second variation is provided with a scanning member 40 that moves the printing medium A and the light emitting member 30 relative to each other in the scanning direction orthogonal to the direction in which the printing medium A and the light emitting member 30 are aligned. While the printing medium A and the light emitting member 30 are moved relative to each other in the scanning direction, the control device 60 controls the intensity of light emitted from the light sources 31 to be larger when the light source gap Gi is the second distance than when the light source gap Gi is the first distance.

Figure 9:
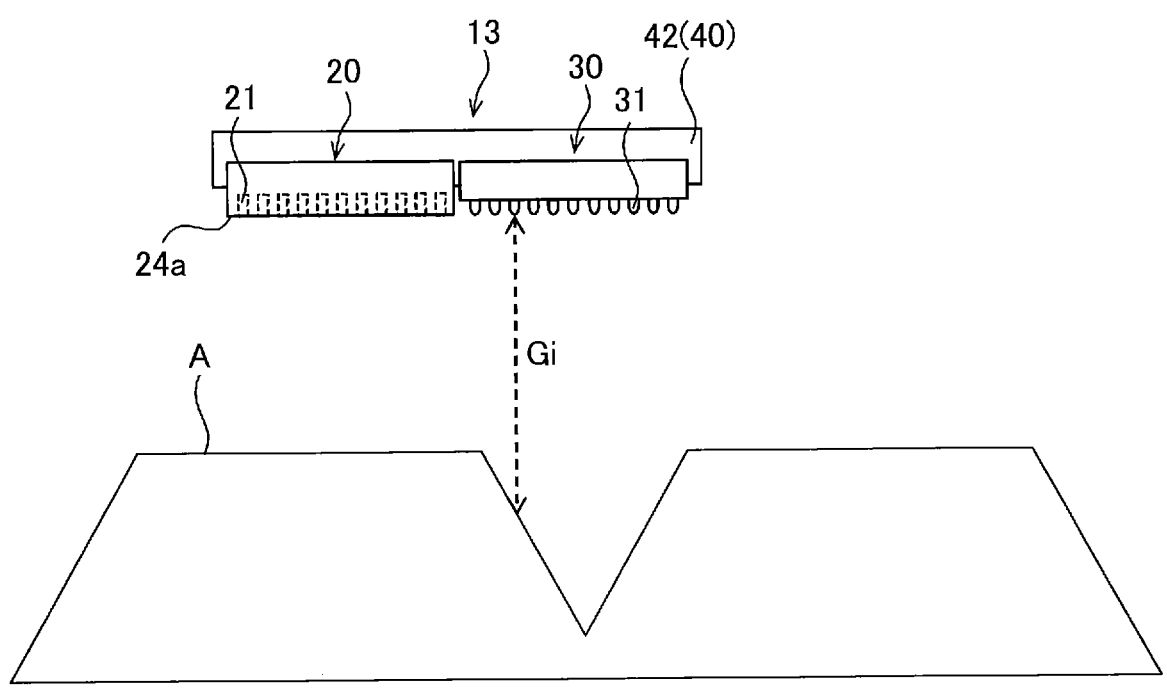
FIG. 9 is a schematic diagram illustrating a head unit and the printing medium viewed from the front.
Figure 9:
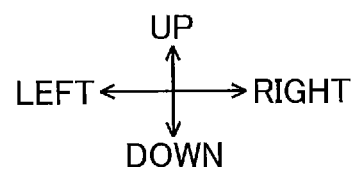

The light source gap Gi is the clearance between a light source 31 and the printing medium A. When the surface of the printing medium A is uneven and the surface has different heights at different positions in the left-right direction as shown in FIG. 9, the light source gap Gi changes according to the irregularities in the surface of the printing medium A as the scanning member 40 moves the head unit 13 in the left-right direction. In such cases, when the light source gap Gi is the second distance greater than the first distance, the control device 60 controls the light emitted from light sources 31 to have greater intensity than the intensity of light emitted when the light source gap Gi is the first distance as the head unit 13 is moved in the left-right direction. The light source gap Gi may be determined based on the shape information acquired in S2. Or, the light source gap Gi may be determined based on detection results of the measurement sensor 14. In this way, the control device 60 can suppress a drop in printing quality due to the shape of the printing medium A while suppressing an increase in cost.

Second Embodiment

Figures 10A, 10B, 10C:
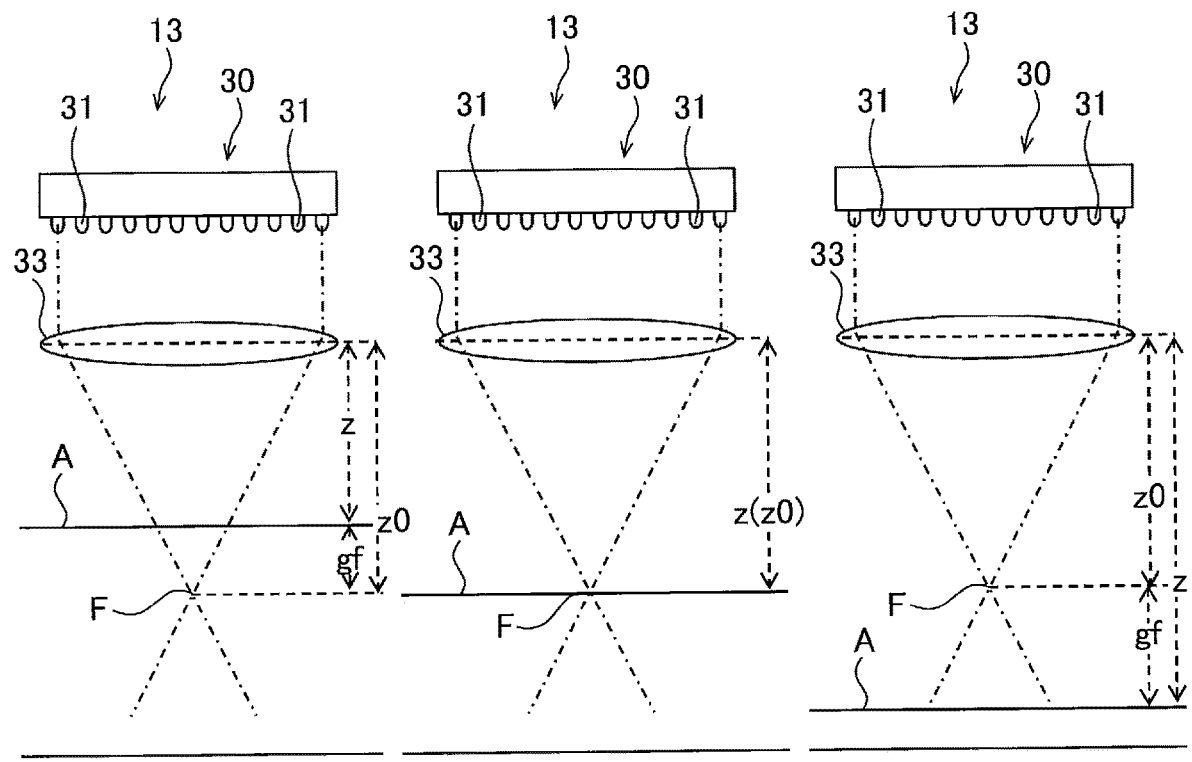
FIG. 10A is an explanatory diagram illustrating a lens and a printing medium when a lens gap is smaller than a focal point distance.
FIG. 10B is an explanatory diagram illustrating the lens and the printing medium when the lens gap is equivalent to the focal point distance.
FIG. 10C is an explanatory diagram illustrating the lens and the printing medium when the lens gap is larger than the focal point distance.

As shown in FIGS. 10A-10C, a printing device 11 according to a second embodiment is provided with a curing device 10, and a recording head 20 (see FIG. 1) capable of ejecting liquid onto a printing medium A. This curing device 10 is provided with a light emitting member 30 having light sources 31 that emit light for curing liquid on the printing medium A, a lens 33 located between the printing medium A and the light sources 31, and a control device 60 (see FIG. 5). Light emitted from the light sources 31 passes through the lens 33 while traveling between the light sources 31 and the printing medium A. Here, a third direction will denote the direction in which the light sources 31 are aligned with the lens 33 (i.e., the vertical direction in this example). Further, the distance in the third direction between the printing medium A and a focal point F of light passing through the lens 33 will be called a focal point gap Gf. The control device 60 controls light sources 31 to emit light at a greater intensity when the focal point gap Gf is a second distance than the intensity of light emitted when the focal point gap Gf is the first distance. Here, the second distance is greater than a first distance.

The lens 33 is disposed between the light emitting member 30 and the printing medium A so as to span (extend across) a plurality (all, for example) of the light sources 31 in the light emitting member 30. The lens 33 is a convex lens, for example, whose axis is aligned in the vertical direction and is parallel to the optical axis of light emitted from the light sources 31, for example. Note that the printing device 11 may have a single lens 33 for all of the light sources 31 in the light emitting member 30. Or, the printing device 11 may have a plurality of lenses 33 and a plurality of lenses 33. In this case, each of the lenses 33 is provided for one or more light sources 31 in the light emitting member 30.

Light emitted from light sources 31 passes through the lens 33 and converges at the focal point F. The illuminance I(z) at a position z (mm) can be found according to the following equation, where z is a distance (mm) to a position on the printing medium A from the lens 33 in the vertical direction, z0 is the focal point distance (mm) from the lens 33 to the focal point F, and I0 is the illuminance of light at the focal point F (mW/cm$^2$). Note that k(i) and n(i) in the following equation are predetermined coefficients.

$$I(z) = I0 \times (1 - \Sigma k(i) * |z-z0|^{n(i)})$$

As indicated in the above equation, the illuminance of light is largest at the focal point F of the lens 33. The illuminance of light on the printing medium A decreases as the focal point gap Gf between the focal point F of the lens 33 and the printing medium A in the vertical direction grows larger. In the example of FIG. 10B, the focal point F of light is located on the surface of the printing medium A. Since the vertical distance z between the lens 33 and the printing medium A (hereinafter called the lens gap z) is equivalent to the focal point distance z0 in this case, the focal point gap Gf is 0 because the focal point gap Gf is the difference between the lens gap z and the focal point distance z0. As an example, it will be assumed here that a lens gap z is 10 mm in the example of FIG. 10B and the illuminance on the printing medium A is 5 mW/cm$^2$ for the lens gap z of 10 mm.

In the example of FIG. 10A, the surface of the printing medium A is above the focal point F of the light and, hence, the lens gap z is smaller than the focal point distance z0. If the intensity of light emitted from a light source 31 is equivalent to that used in the example of FIG. 10B, the illuminance on the printing medium A would be 4.6 mW/cm$^2$ for a lens gap z of 8 mm.

In the example of FIG. 10C, the surface of the printing medium A is below the focal point F of the light and, hence, the lens gap z is greater than the focal point distance z0. If the intensity of light emitted from a light source 31 is equivalent to that used in the example of FIG. 10B, the illuminance on the printing medium A would be 1.4 mW/cm$^2$ for a lens gap z of 16 mm.

In this example, the focal point gap Gf in FIG. 10A is 2 mm and is a first distance that is less than the predetermined distance. In contrast, the focal point gap Gf in the example of FIG. 10C is 6 mm and is a second distance greater than or equal to the predetermined distance. Accordingly, the control device 60 controls the light sources 31 to emit light at a greater intensity when the focal point gap Gf is the second distance as shown in FIG. 10C, than the intensity of light emitted when the focal point gap Gf is the first distance as shown in FIG. 10A. Here, the second distance is greater than the first distance. By making the intensity of light uniform on the printing medium A in this way, the control device 60 can create uniform conditions for curing liquid on the printing medium A with light, thereby suppressing a drop in printing quality due to the shape of the printing medium A. Further, since this uniformity is achieved through control of the light sources 31, an increase in cost can be suppressed.
Other Variations In all of the embodiments and variations described above, the range of light emitted onto the printing medium A from the light emitting member 30 may be larger than the range of liquid ejected onto the printing medium A from the recording head 20. That is, the range of light emitted onto the printing medium A from the light emitting member 30 may cover the range of liquid ejected onto the printing medium A from the recording head 20. That is, while the illuminance of light on the printing medium A is high in the center of the irradiation range due to light from a plurality of light sources 31 overlapping, the illuminance of light on the printing medium A is low on the ends of the irradiation range since there is no or little overlap of light from light sources 31. However, by setting the irradiation range of light on the printing medium A greater than the impact range of liquid, the edges of the light irradiation range having low illuminance are positioned outside the edges of the liquid impact range. Therefore, the illuminance of light can be made uniform in the area that the light irradiation range overlaps the liquid impact range.

For example, the layout of the light sources 31 in the light emitting member 30 may cover a wider range of the layout of the nozzles 21 in the recording head 20. In the embodiments described above, the layout range of nozzles 21 aligned in the front-rear direction is a range C that is equivalent to the layout range of light sources 31 aligned in the front-rear direction, as illustrated in FIG. 4. However, the layout range of light sources 31 may be set wider than the layout range of nozzles 21 in the front-rear direction. In this case, the number of light sources 31 aligned in the front-rear direction may be greater than the number of nozzles 21 aligned in the front-rear direction. As a result, the range of light emitted from the light sources 31 onto the printing medium A in the front-rear direction is wider than the range of liquid ejected onto the printing medium A from the nozzles 21. Consequently, the edges of the light irradiation range are located outside the edges of the liquid impact range in the front-rear direction, and the illuminance of light can be made uniform over the area in which the liquid impact range overlaps the light irradiation range.

Further, when the control device 60 ejects liquid from a part of the plurality of nozzles 21 in the recording head 20, the control device 60 may emit light from the light sources 31 corresponding to those nozzles 21 and one or more light sources 31 arranged around those light sources 31. Since the light irradiation range on the printing medium A overlaps the liquid impact range and becomes larger than the liquid impact range in this case, the illuminance of light in the area of the light irradiation range overlapped by the liquid impact range is made uniform.

Further, when the light source gap Gi between the light source 31 and the printing medium A is the second distance, the control device 60 may control the light sources 31 so that the light irradiation range is larger than the liquid impact range of the corresponding nozzles 21 on the printing medium A. In this case, the control device 60 controls the light sources 31 corresponding to the nozzles 21 and one or more light sources 31 arranged around those light sources 31 to emit light when the light source gap Gi is the second distance which is a large distance. Since the light irradiation range on the printing medium A overlaps and is larger than the liquid impact range, sufficient light for curing the liquid can be emitted even in such cases.

In all of the embodiments and variations described above, the scanning member 40 moves the recording head 20 in the left-right direction relative to the printing medium A which is not moved. However, the scanning member 40 may instead move the conveying device 50 in the left-right direction without moving the recording head 20 in the left-right direction so that the printing medium A moves relative to the recording head 20.

In the first embodiment and its variations described above, the control device 60 determines whether the light source gap Gi is a first distance or a second distance based on a first predetermined distance. However, the threshold distance for determining the light source gap Gi is not limited to one threshold distance but may be two or more.

For example, the control device 60 may determine that the light source gap Gi is a first distance when the light source gap Gi is less than a first predetermined distance, may determine that the light source gap Gi is a second distance greater than the first distance when the light source gap Gi is greater than or equal to the first predetermined distance and less than a second predetermined distance greater than the first predetermined distance, and may determine that the light source gap Gi is a third distance greater than the second distance when the light source gap Gi is greater than or equal to the second predetermined distance.

In this case, the control device 60 sets the intensity of light emitted from the light source 31 when the light source gap Gi is the second distance greater than when the light source gap Gi is the first distance. Further, the control device 60 controls the light sources 31 to emit light at a greater intensity when the light source gap Gi is the third distance than when the light source gap Gi is the second distance.

In this way, as the number of threshold values for the light source gap Gi is increases, the difference in light intensity corresponding to the light source gap Gi becomes smaller, thereby making light illuminance on the printing medium A more uniform. Accordingly, curing properties of liquid on the printing medium A cured by light, such as the hardness and glossiness of the cured liquid, can be made more uniform.

In the first embodiment and its variations described above, the control device 60 may continuously determine the relationships between the light source gaps Gi and the intensity of light emitted from the light sources 31. In this case, the light sources 31 may be light emitting elements that emit light of a variable intensity based on the power supplied thereto, for example. Here, the light intensity is smaller when the supplied power is lower. The control device 60 controls the light sources 31 to emit light of a higher intensity for larger light source gaps Gi. This further reduces the difference in light intensity corresponding to the light source gap Gi and makes the illuminance of light on the printing medium A more uniform. Accordingly, the curing properties of liquid on the printing medium A cured by light can be made more uniform.

While the disclosure has been described in detail with reference to the specific embodiment thereof, it would be apparent to those skilled in the art that various changes and modifications may be made therein without departing from the scope of the invention.

The curing device and the printing device according to the present disclosure are useful as a curing device, a printing device, and the like that can suppress a drop in printing quality due to the shape of the printing medium while suppressing an increase in cost.

What is claimed is:

1. A curing device comprising:
a light emitting member having a plurality of light sources, each of the plurality of light sources being configured to emit light to cure liquid on a printing medium, the plurality of light sources including a first light source and a second light source, each of the plurality of light sources and the printing medium being configured to be located with a gap therebetween;
a moving device configured to relatively move the printing medium and the light emitting member in a moving direction orthogonal to a direction in which the printing medium and the light emitting member are aligned; and
a control device configured to perform:
based on information indicating that a first gap between the first light source and the printing medium is smaller than a threshold value and a second gap between the second light source and the printing medium is greater than or equal to the threshold value,
controlling the first light source to emit light of a first intensity while controlling the moving device to relatively move the printing medium and the light emitting member in the moving direction; and
controlling the second light source to emit light of a second intensity which is greater than the first intensity while controlling the moving device to relatively move the printing medium and the light emitting member in the moving direction.

2. The curing device according to claim 1, wherein the moving device includes a carriage supporting the light emitting member and is configured to move in the moving direction,
wherein the first light source and the second light source are arranged in an orthogonal direction orthogonal to the moving direction.

3. The curing device according to claim 1, wherein the control device controls the intensity of light emitted from each of the plurality of light sources based on shape information of the printing medium.

4. A curing device comprising:
a light emitting member having a plurality of light sources, each of the plurality of light sources being configured to emit light to cure liquid on a printing medium, the plurality of light sources including a first light source and a second light source, each of the plurality of light sources and the printing medium being configured to be located with a gap therebetween;
a moving device configured to relatively move the printing medium and the light emitting member in a moving direction orthogonal to a direction in which the printing medium and the light emitting member are aligned;
a control device configured to perform:
in a case that: a first gap between the first light source and the printing medium is smaller than a threshold value; a second gap between the second light source and the printing medium is greater than or equal to the threshold value; and a difference between the first gap and the second gap is greater than or equal to a predetermined value, controlling the first light source and the second light source so that an intensity of light emitted from the second light source is greater than an intensity of light emitted from the first light source while controlling the moving device to relatively move the printing medium and the light emitting member in the moving direction; and
in a case that: the first gap is smaller than the threshold value; the second gap is greater than or equal to the threshold value; and the difference between the first gap and the second gap is smaller than the predetermined value, controlling the first light source and the second light source so that the intensity of light emitted from the second light source is equivalent to the intensity of light emitted from the first light source while controlling the moving device to relatively move the printing medium and the light emitting member in the moving direction.

5. The curing device according to claim 4, wherein the predetermined value is 10 mm.

6. A printing device comprising:
a curing device including:
a light emitting member having a light source configured to emit light to cure liquid on a printing medium, the light source and the printing medium being configured to be located with a gap therebetween;
a head having a nozzle configured to eject liquid to the printing medium; and
a control device configured to perform:
in a case that the head is in a liquid-ejection region with a nozzle gap between the nozzle and the printing medium smaller than a prescribed distance, controlling the nozzle to eject liquid to the printing medium and controlling the light source to emit light to cure the liquid on the printing medium; and
in a case that the head is in the liquid-ejection region with the nozzle gap greater than or equal to the prescribed distance, preventing the nozzle from ejecting liquid and preventing the light source from emitting the light.

7. The printing device according to claim 6, wherein the head includes a nozzle surface in which the nozzle is formed as an opening,
wherein the control device is configured to perform:
in a case that the head is in the liquid-ejection region with the nozzle gap is smaller than the prescribed distance and with the nozzle opposing an area of the printing medium having an angle relative to the nozzle surface that is greater than or equal to a predetermined angle, preventing the nozzle from ejecting liquid and preventing the light source from emitting the light.

8. The printing device according to claim 7, wherein the prescribed distance is depending on a type of the printing medium.

9. The printing device according to claim 6, wherein the light emitting member includes a first light source and a second light source arranged in a prescribed direction,
wherein the head includes a first nozzle and a second nozzle arranged in the prescribed direction,
wherein the first nozzle is located at the same position as the first light source in the prescribed direction, and the second nozzle is located at the same position as the second light source in the prescribed direction,
wherein the control device is configured to further perform:
in a case that a first nozzle gap between the first nozzle and the printing medium is smaller than the prescribed distance and a second nozzle gap between the second nozzle and the printing medium is greater than or equal to the prescribed distance, controlling the first nozzle to eject liquid to the printing medium when the head is in the liquid-ejection region, and controlling the first light source to emit light of an intensity to cure the liquid on the printing medium; and
preventing the second nozzle from ejecting liquid even when the head is in the liquid-ejection region, and preventing the second light source from emitting the light.

\* \* \* \* \*